US005696408A

United States Patent [19]

Man

[11] Patent Number: 5,696,408
[45] Date of Patent: Dec. 9, 1997

[54] SECONDARY SECURITY IGNITION SWITCH SYSTEM

[76] Inventor: Kenneth Man, 2310 - 11th Street West, Saskatoon, Saskatchewan, Canada, S7K 0G8

[21] Appl. No.: 705,728

[22] Filed: Aug. 30, 1996

Related U.S. Application Data

[63] Continuation-in-part of Ser. No. 604,377, Mar. 12, 1996, abandoned.

[51] Int. Cl.⁶ .................................................. B60R 25/04
[52] U.S. Cl. .................................. 307/10.3; 180/287
[58] Field of Search ................................ 307/10.1–10.6; 180/287; 123/179.1–179.4; 70/243, 292; 290/38 C; 200/43.04, 43.03, 43.08; 340/425.5, 426, 825.3, 825.32, 825.34, 825.69, 825.72

[56] References Cited

U.S. PATENT DOCUMENTS

| | | | |
|---|---|---|---|
| 3,968,666 | 7/1976 | MacKinnon | 70/243 |
| 4,107,543 | 8/1978 | Kaplan | 307/10.2 |
| 4,313,520 | 2/1982 | Chester | 307/10.3 |
| 4,335,370 | 6/1982 | Scalley et al. | 307/10.4 |
| 4,403,675 | 9/1983 | Cardwell | 180/287 |
| 4,452,197 | 6/1984 | Weber | 180/287 |
| 4,596,303 | 6/1986 | Tremblay | 180/287 |
| 5,079,435 | 1/1992 | Tanaka | 307/10.2 |
| 5,115,145 | 5/1992 | Westberg et al. | 307/10.3 |

Primary Examiner—Richard T. Elms

[57] ABSTRACT

A secondary ignition switch system that connects to a conventional ignition switch system of a vehicle to provide a security function. The secondary ignition system includes a dashboard mounted double-pole-double-throw (DPDT) switch and a key operated secondary ignition switch. The DPDT switch controls the operation of the primary and secondary ignition switches. To start the engine the DPDT is set to a position to power the secondary ignition switch, such that the engine can be started by turning a secondary key. However, based on the interconnection of the ignition switches the steering column of the vehicle remains locked. Only until the operator uses the primary key to unlock the steering assembly can the car be driven. This system enables the engine of a vehicle to run including powering the accessory circuit (for heating/cooling and power accessories) to warm a vehicle in cold climates with minimized risk since the steering assembly remains locked. In addition, when the secondary key is removed from the secondary ignition switch no current flows to the primary ignition switch rendering the entire system disabled.

6 Claims, 6 Drawing Sheets

SECONDARY SECURITY IGNITION SWITCH SYSTEM

CROSS-REFERENCE TO RELATED APPLICATION

This application is a continuation-in-part of application Ser. No. 08/604,377, filed Mar. 12, 1996, now abandoned.

FIELD OF THE INVENTION

This invention relates to the field of vehicle security systems, and more particularly, to dual ignition systems that are switch controllable to prevent the vehicle from being driven under certain conditions.

BACKGROUND OF THE INVENTION

Vehicle theft is becoming an increasing complex problem. More than just an alarm system is needed since many theft alarm systems are quickly disarmed by the knowledgeable thief who can then merely bypass the ignition switch and drive the vehicle.

Many prior art systems have been proposed that attempt to establish a lock out circuit to prevent the vehicle from being started if a hidden switch is not activated. Usually, these systems provide a control relay having a protection position in which the vehicle ignition system and starter are disabled and an alarm system is enabled and a use position in which the ignition system and starter are enabled. The alarm system is disabled.

For example, U.S. Pat. No. 4,063,610 issued Dec. 20, 1977 to Shilling teaches a vehicle theft-protection system having a concealed switch operable to disable the ignition system. U.S. Pat. No. 5,304,979 issued Apr. 19, 1994 to Lima et al. teach a circuit system that senses the state of the ignition switch, setting a lock out circuit to prevent the car from being started if a hidden switch is not activated.

The disadvantage of these systems is that hidden switches do not necessarily remain hidden. Specifically, installation operators tend to mount the switch in several fixed locations (trunk, glove compartment etc.). This makes bypassing the security system relatively simple. Further, activating the security switch renders the entire ignition switch inoperative, which disables not only the starter but also the accessory circuit of the vehicle. For example, if a user of some vehicle wishes to maintain a running engine, or maintain power to the accessory circuit (to power heaters, coolers, lights etc.) when one is away from the vehicle this cannot be accomplished by the existing security systems.

Consequently, there is a need for an ignition system that enables the user to start the engine and activate the accessory circuit in a vehicle yet lock the steering assembly and gear shift (for automatic transmissions) until a primary key is used to unlock the steering assembly.

SUMMARY OF THE INVENTION

An object of the present invention is to provide a secondary ignition switch system that enables the user to start the engine of a vehicle and lock the steering assembly and gear shift, if applicable.

Another object of the present invention is to provide a secondary ignition switch system that enables the user to unlock the steering assembly of a vehicle having a running engine without damaging the starter.

Another object of the present invention is to provide a secondary ignition switch system that enables the user to disable the primary ignition switch by terminating current flow from the battery.

In accordance with one aspect of the present invention, there is provided a secondary ignition system adapted to be connected to a primary ignition system of a vehicle, the primary ignition system having a starter, a primary key operated locking ignition switch, and a steering assembly, said secondary ignition system comprising: (a) a secondary key operated ignition switch electrically connected to the primary ignition switch; and (b) a switch having a first position for electrically connecting the secondary ignition switch to the starter.

In accordance with another aspect of the present invention, there is provided a secondary ignition system adapted to be connected to a primary ignition system of a vehicle, the primary ignition system having a starter, a primary key operated locking ignition switch, a steering assembly, and a battery having a positive terminal and a negative terminal, said secondary ignition system comprising: (a) a secondary key operated ignition switch electrically connected to the primary ignition switch, said secondary ignition switch having an accessory terminal, an ignition terminal, a battery terminal, and a starter terminal; and (b) a switch having a first, second and third battery terminals and a first, second and third starter terminals, wherein: the first battery terminal of the switch is connected to the battery terminal of the secondary ignition switch; the second battery terminal of the switch is connected to the positive terminal of the battery; the third battery terminal of the switch is connected to the battery terminal of the primary ignition switch; the first starter terminal of the switch is connected to the starter terminal of the secondary ignition switch; the second starter terminal of the switch is connected to the solenoid of the starter; the third starter terminal of the switch is connected to the solenoid terminal of the primary ignition switch; and wherein: the accessory terminal of the secondary ignition switch is connected to the accessory terminal of the primary ignition switch; and the ignition terminal of the secondary ignition switch is connected to the ignition terminal of the primary ignition switch, whereby when switch is in a first position the secondary ignition switch is operative, such that the secondary key will start the engine of the vehicle and power the accessory circuit, and locks the steering assembly; when the switch is in a second position the secondary ignition switch is disabled and the primary ignition switch is operative, such that the primary key starts the engine and unlocks the steering assembly; and when the switch is in a third position the locking primary ignition switch and the secondary ignition switch are disabled.

In accordance with another aspect of the present invention there is provided a secondary ignition system adapted to be connected to a primary ignition system of a vehicle, the primary ignition system having a starter, a primary key operated locking ignition switch, a steering assembly, and a battery having a positive terminal and a negative terminal, said secondary ignition system comprising: (a) a secondary key operated ignition switch electrically connected to the primary ignition switch, said secondary ignition switch having an accessory terminal, an ignition terminal, a battery terminal, a starter terminal, and a secondary key; and (b) a switch having a first, second and third battery terminals and a first, second and third starter terminals, wherein: the first battery terminal of the switch is connected to the battery terminal of the secondary ignition switch; the second battery terminal of the switch is connected to the positive terminal of the battery; the third battery terminal of the switch is connected to the battery terminal of the secondary ignition switch; the first starter terminal of the switch is connected to the starter terminal of the secondary ignition switch; the second starter terminal of the switch is connected to the solenoid of the starter; the third starter terminal of the switch is connected to the solenoid terminal of the primary ignition switch; and wherein: the accessory terminal of the secondary ignition switch is connected to the battery terminal of the primary ignition switch; and the ignition terminal of the secondary ignition switch is connected to the accessory terminal and to the ignition terminal of the primary ignition switch, whereby when switch is in a first position the secondary ignition switch is operative, such that the secondary key will start the engine of the vehicle and power the accessory circuit, and locks the steering assembly; when the switch is in a second position the secondary ignition switch is disabled and the primary ignition switch is operative, such that the primary key starts the engine and unlocks the steering assembly; and when the switch is in the third position and the secondary key is removed from the secondary key operation ignition switch the locking primary ignition switch and the secondary ignition switch are disabled with no current flow to the primary ignition switch.

BRIEF DESCRIPTION OF THE DRAWINGS

Embodiments of the invention will be described by way of example with the drawings in which.

DETAILED DESCRIPTION OF THE INVENTION

Figure 1:
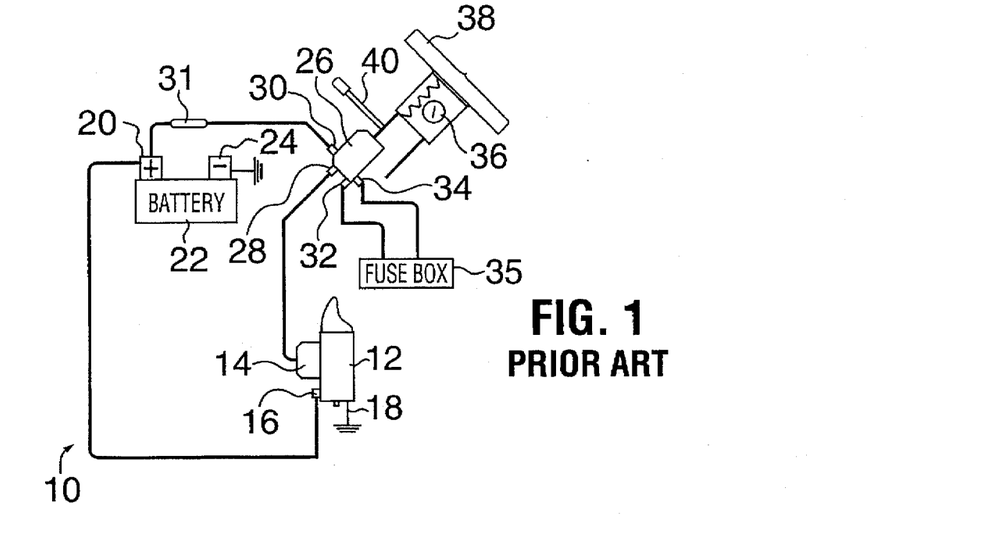
FIG. 1 illustrates a schematic view of a typical prior art primary ignition switch system.

FIG. 1 illustrates a conventional ignition switch system 10. The ignition system 10 includes a starter 12 having a solenoid 14 and positive and negative terminals 16 and 18, respectively. The positive terminal 16 on the starter 12 is connected to a positive terminal 20 on a battery 22. The battery 22 includes a negative terminal 24, which with the negative terminal 18 of the starter 12 are connected to ground.

The ignition system 10 includes a primary ignition switch 26 having four terminals: a solenoid terminal 28, a battery terminal 30, an accessory terminal 32, and an ignition terminal 34. The battery terminal 30 is connected to the positive terminal 20 of the battery 22 through a fuse 31. The solenoid terminal 28 is connected to the solenoid 14 on the starter 12. The accessory terminal 32 and the ignition terminal 34 are connected to a fuse box 35 to power accessories in a vehicle such as heating/cooling systems, lights, radio, power windows, door locks, and dashboard gauges etc., hereinafter referred to collectively as the accessory system.

A primary ignition key 36 is mounted on a steering assembly 38 having a gear shift 40 mounted thereon (not applicable for vehicles equipped with manual transmissions) for key operating the primary ignition switch 26 in the traditional manner.

Figure 2:
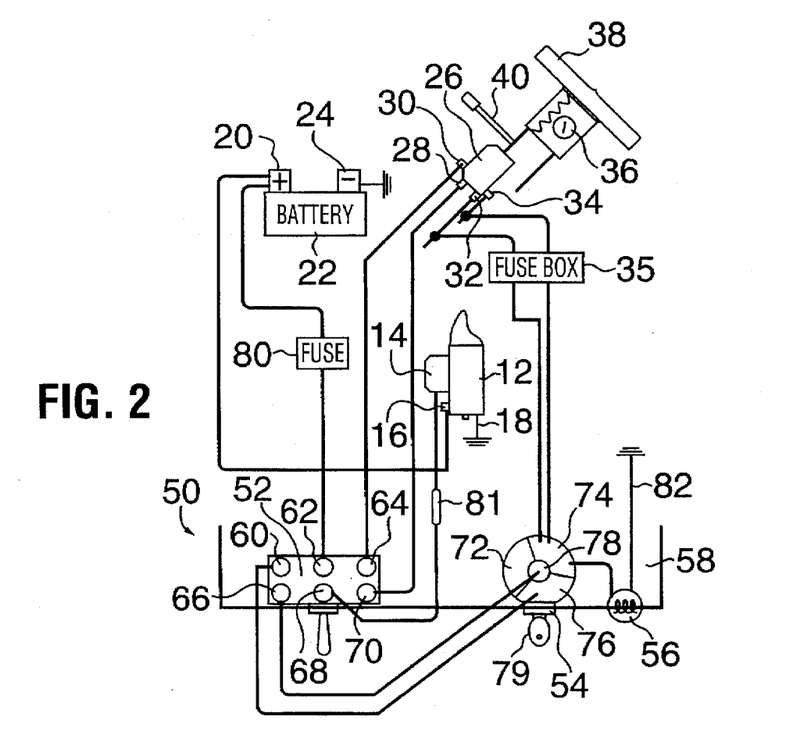
FIG. 2 illustrates a schematic view of a secondary ignition switch system according to an embodiment of the present connected to the primary ignition switch system of FIG. 1.

FIG. 2 illustrates a complete operating circuit of a secondary security ignition switch system 50 according to the present invention. The secondary ignition system 50 is connected to the traditional ignition system 10.

The secondary ignition system 50 includes a double-pole-double-throw (DPDT) switch 52, a secondary ignition switch 54, and an indicator lamp 56. These components are mounted in a case 58 that can be mounted on a dashboard (or other suitable location) of a vehicle.

The DPDT switch 52 is used to control the operation of the primary and secondary ignition switches 26 and 54. The DPDT switch 52 includes six terminals: battery terminals 60, 62, and 64; and starter terminals 66, 68, and 70. The secondary ignition switch 54 includes four terminals: an accessory terminal 72, an ignition terminal 74, a battery terminal 76, and a starter terminal 78. A secondary ignition key 79 controls the operation of the secondary ignition switch 54.

Tables A and B define the connection topography of the DPDT switch 52 (Table A) and the secondary ignition switch 54 (Table B) between each other and with the components of the conventional ignition system 10.

TABLE A

| SOURCE TERMINAL (DPDT SWITCH 52) | TARGET TERMINAL |
| --- | --- |
| battery terminal 60 | battery terminal 76 of secondary ignition switch 54 |
| battery terminal 62 | positive terminal 20 of battery 22 through a fuse 80 |
| battery terminal 64 | battery terminal 30 of primary ignition switch 26 |
| starter terminal 66 | starter terminal 78 of secondary ignition switch 54 |
| starter terminal 68 | solenoid 14 of starter 12 through a fuse 81 |
| starter terminal 70 | starter terminal 28 of primary ignition switch 26 |

TABLE B

| SOURCE TERMINAL (SECONDARY IGNITION SWITCH 54) | TARGET TERMINAL |
| --- | --- |
| accessory terminal 72 | accessory terminal 32 of the primary ignition switch 26 |
| ignition terminal 74 | ignition terminal 34 of primary ignition switch 26; and an indicator lamp 56 grounded by a conductor 82 |
| battery terminal 76 | battery terminal 60 of DPDT switch 52 |
| starter terminal 78 | starter terminal 66 of DPDT switch 52 |

FIGS. 3 to 6 illustrate circuit connections for various operating conditions of the systems 10 and 50 shown in FIG. 2. For simplicity, only the relevant connections between various terminals are shown in the drawings.

Figure 3:
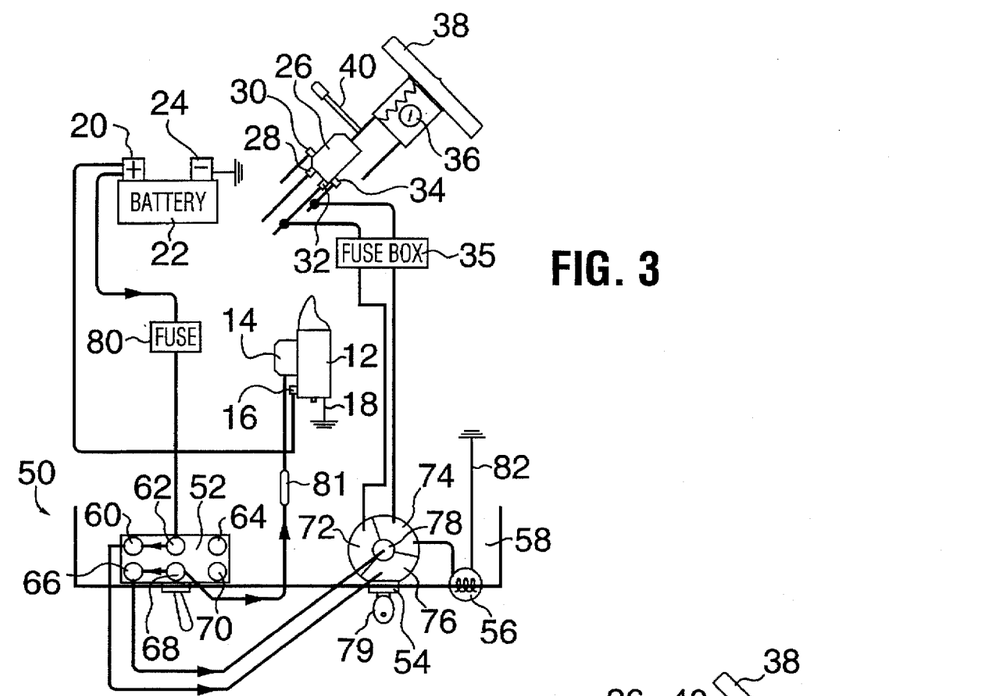
FIG. 3 illustrates a partial schematic view of the ignition systems shown in FIG. 2 in a first operating condition.

FIG. 3 illustrates the system 50 with the DPDT switch 52 moved to the right thereby electrically connecting terminal pairs 60/62 and 66/68. Current flows (shown by directional arrows) from the positive terminal 20 of the battery 22 through the fuse 80 and through the battery terminals 60 and 62 of the DPDT switch 52 to the battery terminal 76 of the secondary ignition switch 54. The solenoid terminal 14 of the starter 12 and the starter terminal 78 of the secondary ignition switch 54 are also powered.

By turning the secondary key 79 of the ignition switch 54 the engine starts, the indicator lamp 56 is illuminated, and current is supplied to the accessory terminals 72 and 32 to power the accessory circuit. This enables the operator of the vehicle to use the heating/cooling systems and other sundry, accessory devices.

The steering assembly 38 and the gear shift 40 are locked because no current is flowing to the battery terminal 30 and the solenoid terminal 28 of the primary ignition switch 26. A security function of the present invention is activated at this stage of operation. In particular, in cases where the user of a vehicle wants the engine running to (a) warm up the engine and vehicle during cold temperature operation, or (b) maintain the engine in a running state while the user leaves the vehicle unattended for a short time, the security function ensures that the vehicle cannot be driven.

Theft of the vehicle is very difficult since although the engine in functioning the steering assembly 38 and shift 40 are locked thereby rendering the vehicle inoperable until the primary key 36 is turned to unlock the steering assembly 38.

Since no current is flowing to terminals 28 and 30 of the primary ignition switch 26 the primary key 36 can be turned on to only unlock the steering assembly 38. A further safety feature is active at this stage since with no current flowing to the solenoid terminal 28 of the primary ignition switch 26 the user can mm the primary key 36 to the "dead end" position (i.e. completely to the right) without causing damage to the starter 18.

Figure 4:
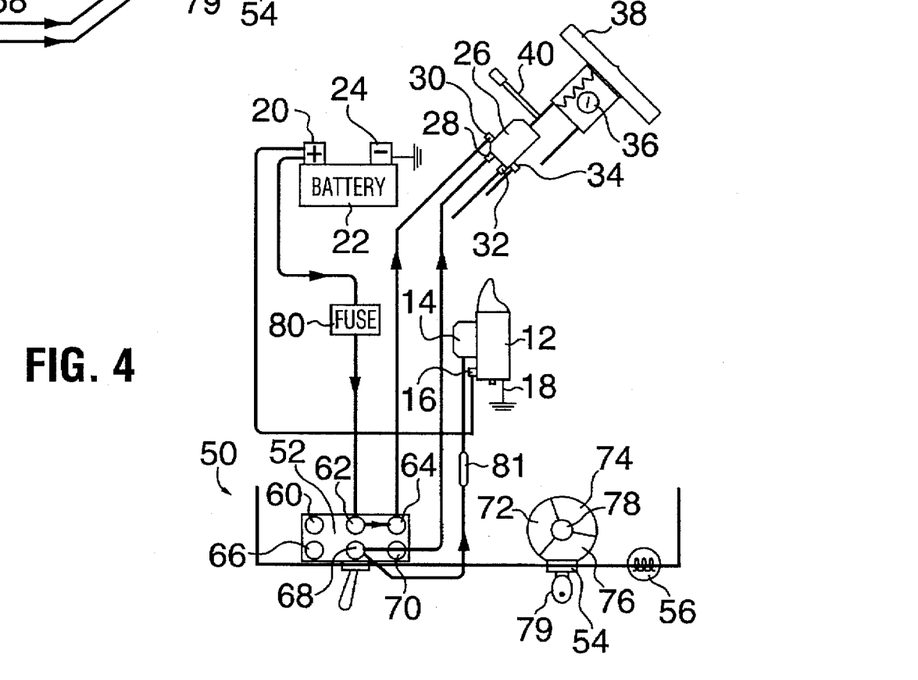
FIG. 4 illustrates a partial schematic view of the ignition systems shown in FIG. 2 in a second operating condition.

FIG. 4 illustrates the system 50 with the DPDT switch 52 moved to the left thereby electrically connecting terminal pairs 62/64 and 68/70. Current flows (shown by directional arrows) from the positive terminal 20 of the battery 22 through the fuse 80 and through the battery terminals 62 and 64 of the DPDT switch 52 to the battery terminal 30 of the primary ignition switch 26. The starter terminal 28 of the primary ignition switch 26 and the solenoid 14 of the starter 12 are also powered. The vehicle engine starts by turning the primary key 36. The steering assembly 38 and gear shift 40 are unlocked, and the ignition and accessory terminals 34 and 32 are also functioning.

In the arrangements shown in FIG. 4, the secondary ignition switch 54 is not functioning since no current is flowing from the DPDT switch 52 to the secondary ignition switch 54.

Figure 5:
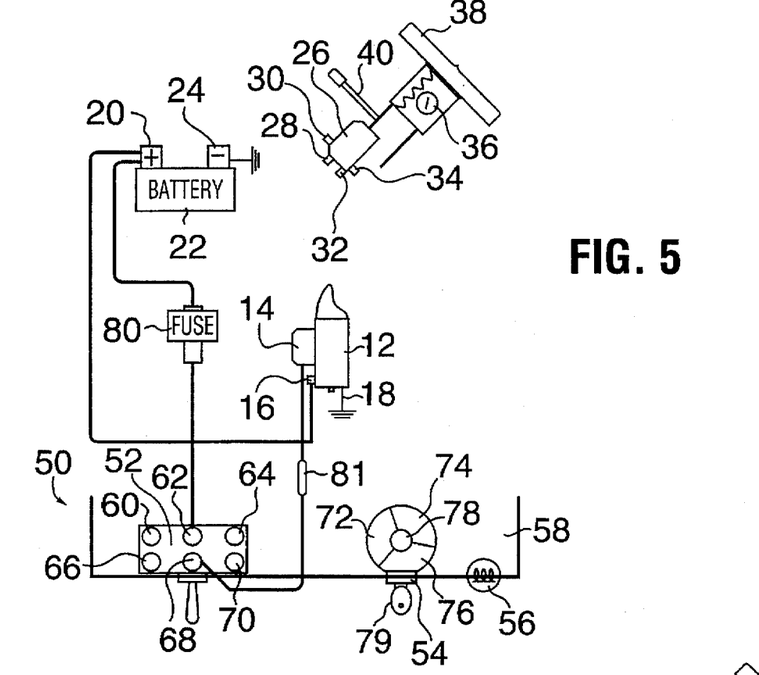
FIG. 5 illustrates a partial schematic view of the ignition systems shown in FIG. 2 in a third operating condition.

FIG. 5 illustrates the system 50 with the DPDT switch 52 in the neutral central position. No current flows from the battery 22 to either of the primary or secondary ignition switches 26 and 54, respectively. In this arrangement, the vehicle will not start and the accessories will not function when either the primary key 36 or the secondary key 79 is turned.

Figure 6:
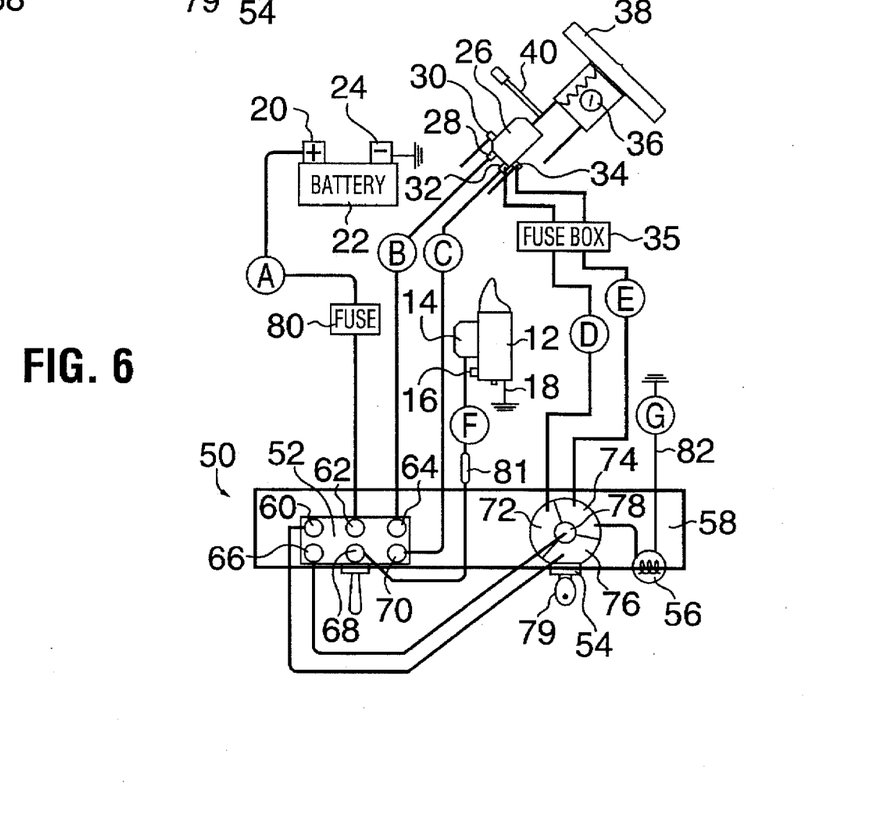
FIG. 6 illustrates a partial schematic view of the wiring topography of the secondary ignition switch system of FIG. 2.

FIG. 6 illustrates the seven wires (A to G) of the secondary system 50. The procedure for connecting the secondary system 50 to the conventional ignition system 10 is outlined below:

1. Cut and disconnect the original wire leading to the battery terminal 30;
2. Cut and disconnect the original wire leading to the starter terminal 28;
3. Attach wire B from battery terminal 64 of the DPDT switch 52 to the battery terminal 30 of the primary ignition switch 26;
4. Attach wire C from starter terminal 70 of the DPDT switch 52 to the starter terminal 28 of the primary ignition switch 26;
5. Attach wire D from accessory terminal 72 of the secondary ignition switch 54 to the accessory terminal 32 of the primary ignition switch 26 through the fuse box 35;
6. Attach wire E from ignition terminal 74 of the secondary ignition switch 54 to the ignition terminal 34 of the primary ignition switch 26 through the fuse box 35;
7. Attach wire A from the battery terminal 62 of the DPDT switch 52 to the positive terminal 20 of the battery 22 through the fuse 80;
8. Attach wire F from the starter terminal 68 of the DPDT switch 52 to the solenoid 14 of the starter 12 through a fuse 81;
9. Attach wire G from the indicator lamp 56 to ground; and
10. Connect:
    (a) the battery terminal 60 of the DPDT switch 52 to the battery terminal 76 of the secondary ignition switch 54;
    (b) the starter terminal 66 of the DPDT switch 52 to the starter terminal 78 of the secondary ignition switch 54; and
    (c) the indicator lamp 56 to the ignition terminal 74 of the secondary ignition switch 54.

The secondary ignition switch system 50 of the present invention permits selective use of two ignition switches 26, 54 to control the desired level of security as follows:

(1) DPDT switch 52 in center position (FIG. 5) renders both the primary ignition switch 26 and the secondary ignition switch 50 inoperative. Turning either the primary or the secondary key 36, 79 will not start the engine, or power the accessory circuit of a vehicle.

(2) DPDT switch 52 in right position (FIG. 3) renders the primary ignition switch 26 partially inoperative and renders the secondary ignition switch 50 operative. Turning the secondary key 79 will start the engine of a vehicle and power the accessory circuit, but will not unlock the steering assembly 38. The user must insert and turn the primary key 36 to unlock the steering assembly 38 to enable the vehicle to be driven.

(3) DPDT switch 52 in left position (FIG. 4) renders the secondary ignition switch 50 inoperative and renders the primary ignition switch 26 operative. Turning the primary key 36 starts the engine and unlocks the steering assembly 36.

FIGS. 7 to 12 illustrate a secondary security ignition system 100 according to another embodiment of the present invention.

Figure 7:
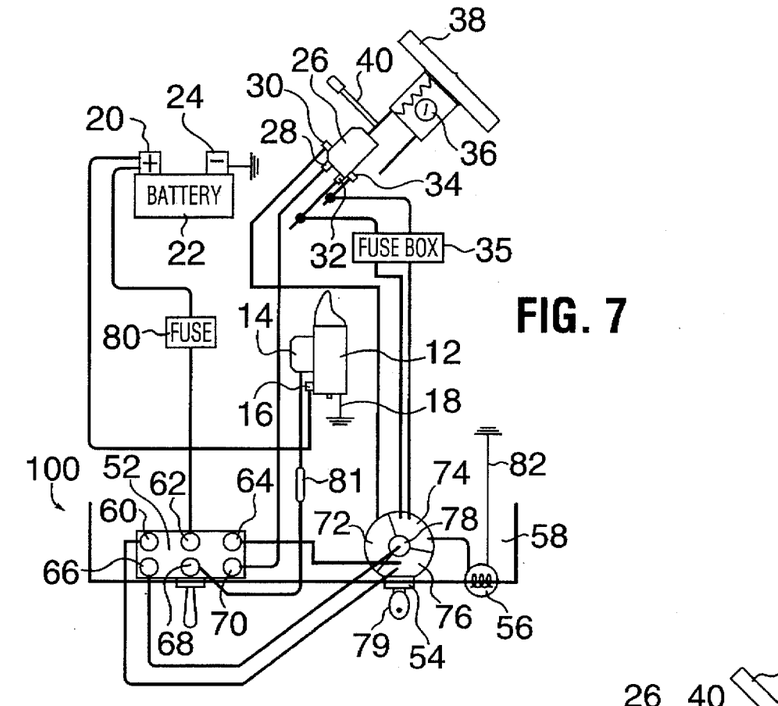
FIG. 7 illustrates a schematic view of a secondary ignition switch system according to another embodiment of the present connected to the primary ignition switch system of FIG. 1.

The system 100 has a connection topography as shown in FIG. 7. The wiring interconnection of the system 50 shown in FIG. 2 is modified between three terminals as summarized in Table C. All the other connections shown in FIG. 2 and recited in Tables A and B remain unchanged.

TABLE C

| Change No. | Source Terminal | Target Terminal |
| --- | --- | --- |
| 1 | battery terminal 64 of the DPDT switch 52 | battery terminal 76 of the secondary ignition switch 54 |
| 2 | accessory terminal 72 of secondary ignition switch 54 | battery terminal 30 of primary ignition switch 26 |
| 3 | accessory terminal 32 of primary ignition switch 26 | ignition terminal 74 of secondary ignition switch 54 |

FIGS. 8 to 12 illustrate circuit connections for various operating conditions of the systems 10 and 100 shown in FIG. 6. For simplicity, only the relevant connections between various terminals are shown in the drawings.

Figure 8:
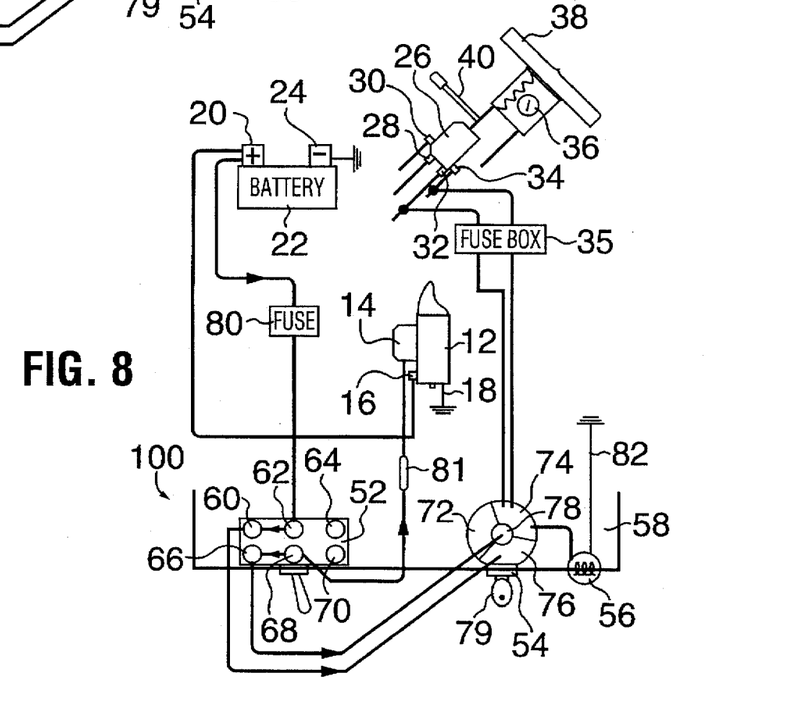
FIG. 8 illustrates a partial schematic view of the ignition systems shown in FIG. 7 in a first operating condition.

FIG. 8 illustrates the system 100 when the DPDT switch 52 is positioned to the right with the secondary ignition switch key 79 in place. Current flows from the battery 22 to the battery terminal 76 of the secondary ignition switch 54 through the battery terminals 60 and 62 of the DPDT switch 52. By turning the secondary key 79 on the engine starts and the indicator lamp 56 is illuminated. The ignition and accessory systems of the vehicle are operating since the ignition terminal 74 of the secondary ignition switch 54 is electrically connected to the accessory terminal 32 and the ignition terminal 34 of the primary ignition switch 26.

In this configuration, the steering assembly 38 and the gear shift 40 remain locked since there is no current flowing to the solenoid terminal 28 or to the battery terminal 30 of the primary ignition switch 26. The primary key 36 can be turned to a dead end position (i.e. completely to the right) to unlock the steering assembly 38 and gear shift 40 without causing the starter drive to hit the ring gear of the flywheel that can damage the starter 12.

Figure 9:
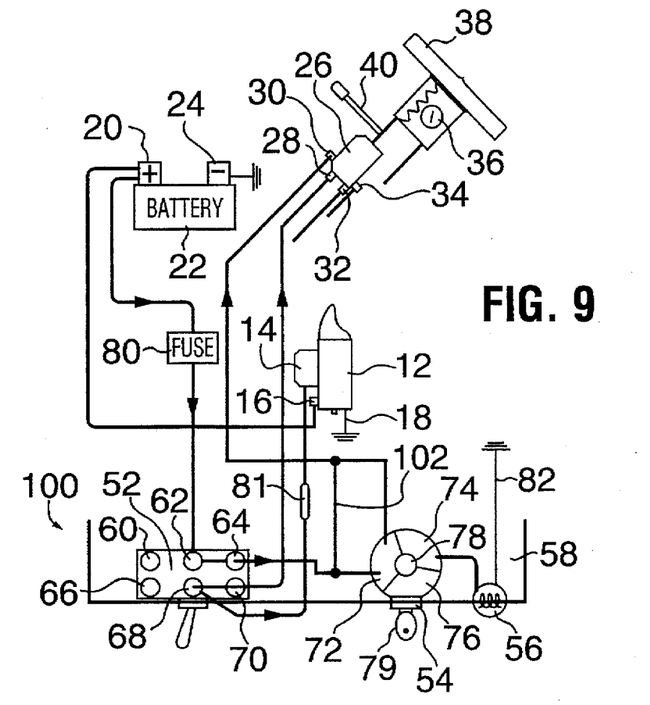
FIG. 9 illustrates a partial schematic view of the ignition systems shown in FIG. 7 in a second operating condition.

FIG. 9 illustrates the system 100 when the DPDT switch 52 is positioned to the left with the secondary key 79 in place. When the secondary key 79 is turned to an accessory position (i.e. to the left), current flows from the battery 22 to the battery terminal 30 of the primary ignition switch 26 through the battery terminals 62 and 64 of the DPDT switch 52 and the battery terminal 76 and the accessory terminal 72, which are electrically connected as shown by the connector line 102, of the secondary ignition switch 74. This enables use of the accessories in the vehicle by turning the primary key to the accessory position (i.e. to the left).

Figure 10:
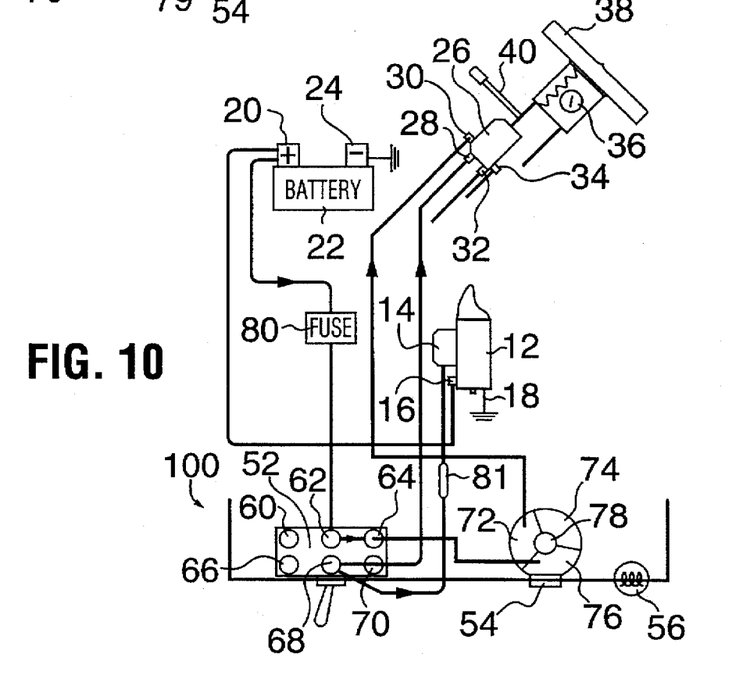
FIG. 10 illustrates a partial schematic view of the ignition systems shown in FIG. 7 in a variant of the second operating condition.

FIG. 10 illustrates the system 100, in the configuration of FIG. 9, with the secondary key 79 removed. In this arrangement no connection is made between the accessory terminal 72 and the battery terminal 76 of the secondary ignition switch 74. The primary ignition switch 26 will not function because no current is flowing from the battery 22 of the battery terminal 30 of the primary ignition switch 26. Consequently, the vehicle cannot be started and the accessory system cannot be powered. A significant security function is operating in this configuration since the primary ignition switch 26 is completed disabled with no current source. With no current source the vehicle cannot be started with or without the primary key 36.

Figure 11:
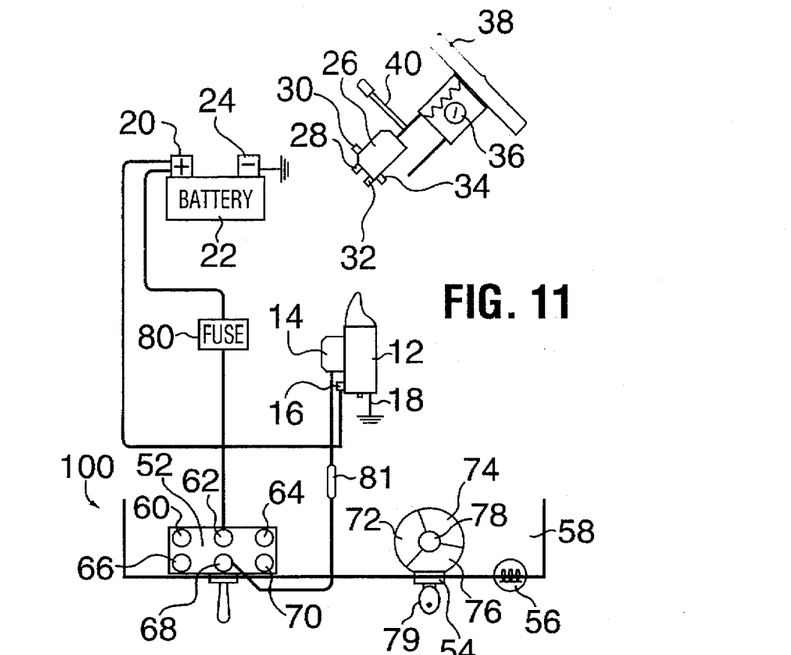
FIG. 11 illustrates a partial schematic view of the ignition systems shown in FIG. 7 in a third operating condition.

FIG. 11 illustrates the system 100 when the DPDT switch 52 is positioned in the central neutral position with the secondary key 79 in place. In this arrangement, no current is flowing from the battery 22 to either the primary or the secondary ignition switches 26 and 54. The accessory and ignition systems of the vehicle are disabled.

Figure 12:
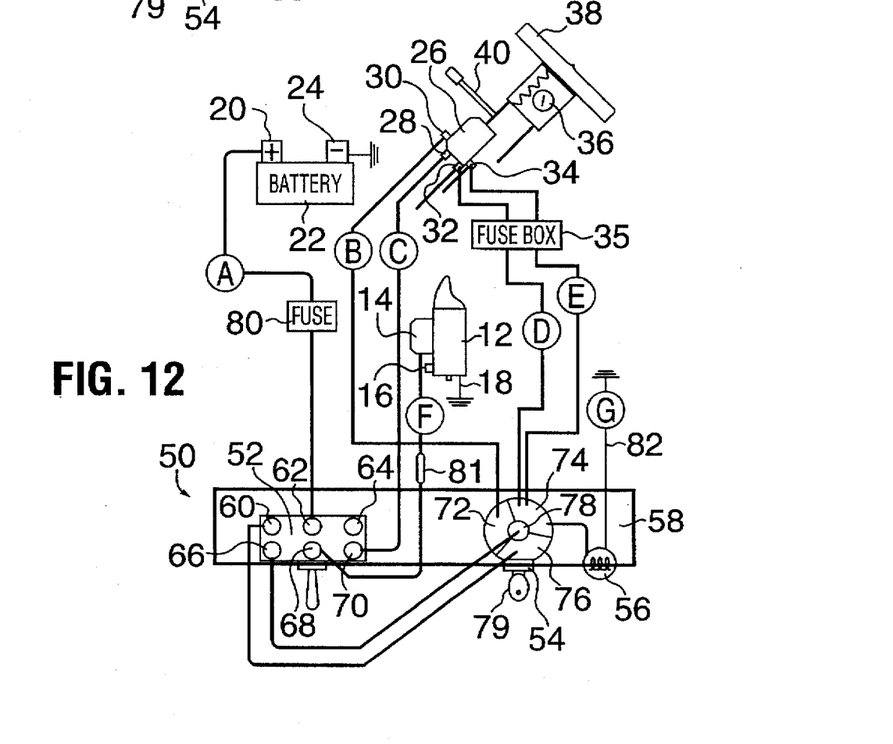
FIG. 12 illustrates a partial schematic view of the wiring topography of the secondary ignition switch system of FIG. 7.

FIG. 12 illustrates the seven wires (A to G) of the secondary system 100. The procedure for connecting the secondary system 100 to the conventional ignition system 10 is outlined below:

1. Cut and disconnect the original wire leading to the battery terminal 30;
2. Cut and disconnect the original wire leading to the starter terminal 28;
3. Attach wire B from the accessory terminal 72 of the secondary ignition switch 54 to the battery terminal 30 of the primary ignition switch 26;
4. Attach wire C from starter terminal 70 of the DPDT switch 52 to the starter terminal 28 of the primary ignition switch 26;
5. Attach wire D from the ignition terminal 74 of the secondary ignition switch 54 to the accessory terminal 32 of the primary ignition switch 26 through the fuse box 35;
6. Attach wire E from ignition terminal 74 of the secondary ignition switch 54 to the ignition terminal 34 of the primary ignition switch 26 through the fuse box 35;
7. Attach wire A from the battery terminal 62 of the DPDT switch 52 to the positive terminal 20 of the battery 22 through the fuse 80;
8. Attach wire F from the starter terminal 68 of the DPDT switch 52 to the solenoid 14 of the starter 12 through a fuse 81;
9. Attach wire G from the indicator lamp 56 to ground; and
10. Connect:
    (a) the battery terminal 60 of the DPDT switch 52 to the battery terminal 76 of the secondary ignition switch 54;
    (b) the starter terminal 66 of the DPDT switch 52 to the starter terminal 78 of the secondary ignition switch 54;
    (c) the battery terminal 64 of the DPDT switch 52 to the battery terminal 76 of the secondary ignition switch 54; and
    (d) the indicator lamp 56 to the ignition terminal 74 of the secondary ignition switch 54.

The systems 50 and 100 of the present invention provide the following features:

(A) When the system 100 is in the configuration of FIG. 8 the engine can be started by using the secondary key 79 and bypassing the primary ignition switch 26.

(B) When the system 100 is in the configuration of FIG. 8, both accessory and ignition systems are operable to power devices such as the radio, heater, air conditioning and other equipment while the steering wheel 38 and gear shift 40 remain locked.

(C) When the secondary ignition switch 54 is operating in both systems 50 and 100, the primary ignition switch 26 can be turned on simultaneously. It is not necessary to turn off the secondary ignition switch 54 before starting the primary ignition switch 26.

(D) When the secondary ignition switch 54 is operating in both systems 50 and 100, the primary ignition switch 54 can be turned on with the primary key 36 set to the dead end position without damaging the starter 12.

(E) When the DPDT switch 52 of the system 100 is set in the neutral center position as shown in FIG. 9, it separates both the primary ignition switch 26 and the secondary ignition switch 54 acting as a dead switch that does not permit any current flow from the battery 22 making any type of operation impossible.

(F) The systems 50 and 100 are not directly connected to the vehicle's computer or module systems ensuring that a wireless remote control unit can be safely added to the systems 50 and 100.

(G) When the secondary key 79 is removed from the secondary ignition switch 54 of system 100 there is no current flowing to the primary ignition switch 26 making it virtually impossible to start the engine with the primary key 36 or by using a screwdriver to break and enter through the primary lock assembly.

I claim:

1. A secondary ignition system adapted to be connected to a primary ignition system of a vehicle having an engine, the primary ignition system including a starter having a solenoid, a primary key operated locking ignition switch having a primary key, an accessory terminal, an ignition terminal, a battery terminal, and a solenoid terminal, a steering assembly, and a battery having a positive terminal and a negative terminal, said secondary ignition system comprising:

(a) a secondary key operated ignition switch electrically connected to the primary ignition switch; and (b) a double-pole-double-throw (DPDT) switch having a first position for electrically connecting the secondary ignition switch to the starter, a second position for electrically connecting the primary ignition switch to the starter, and a third position for electrically disconnecting the primary ignition switch and the secondary ignition switch from the starter.

2. The system of claim 1, further comprising an indicator lamp electrically connected to the secondary ignition switch for indicating the operating status of the secondary ignition switch.

3. The system of claim 1, wherein:

(a) the secondary ignition switch includes a secondary key, an accessory terminal, an ignition terminal, a battery terminal, and a starter terminal; and (b) the DPDT switch includes a first, second and third battery terminals and a first, second and third starter terminals, wherein:

the first battery terminal of the DPDT switch is connected to the battery terminal of the secondary ignition switch; the second battery terminal of the DPDT switch is connected to the positive terminal of the battery; the third battery terminal of the DPDT switch is connected to the battery terminal of the primary ignition switch; the first starter terminal of the DPDT switch is connected to the starter terminal of the secondary ignition switch; the second starter terminal of the DPDT switch is connected to the solenoid of the starter; the third starter terminal of the DPDT switch is connected to the solenoid terminal of the primary ignition switch; and wherein:

the accessory terminal of the secondary ignition switch is connected to the accessory terminal of the primary ignition switch; and the ignition terminal of the secondary ignition switch is connected to the ignition terminal of the primary ignition switch, whereby when the DPDT switch is in the first position the secondary ignition switch is operative, such that the secondary key will start the engine of the vehicle and power the accessory terminal of the secondary ignition switch, and locks the steering assembly;

when the DPDT switch is in the second position the secondary ignition switch is disabled and the primary ignition switch is operative, such that the primary key starts the engine and unlocks the steering assembly; and when the DPDT switch is in the third position the locking primary ignition switch and the secondary ignition switch are disabled.

4. The system of claim 1, wherein:

(a) the secondary ignition switch includes a secondary key, an accessory terminal, an ignition terminal, a battery terminal, and a starter terminal; and (b) the DPDT switch includes a first, second and third battery terminals and a first, second and third starter terminals, wherein:

the first battery terminal of the DPDT switch is connected to the battery terminal of the secondary ignition switch; the second battery terminal of the DPDT switch is connected to the positive terminal of the battery, the third battery terminal of the DPDT switch is connected to the battery terminal of the secondary ignition switch; the first starter terminal of the DPDT switch is connected to the starter terminal of the secondary ignition switch; the second starter terminal of the DPDT switch is connected to the solenoid of the starter; the third starter terminal of the DPDT switch is connected to the solenoid terminal of the primary ignition switch; and wherein:

the accessory terminal of the secondary ignition switch is connected to the battery terminal of the primary ignition switch; and the ignition terminal of the secondary ignition switch is connected to the accessory terminal and to the ignition terminal of the primary ignition switch, whereby when the DPDT switch is in the first position the secondary ignition switch is operative, such that the secondary key will start the engine of the vehicle and power the accessory terminal of the secondary ignition switch, and locks the steering assembly;

when the DPDT switch is in the second position the secondary ignition switch is disabled and the primary ignition switch is operative, such that the primary key starts the engine and unlocks the steering assembly; and when the DPDT switch is in the third position and the secondary key is removed from the secondary key operated ignition switch the locking primary ignition switch and the secondary ignition switch are disabled with no current flow to the primary ignition switch.

5. A secondary ignition system adapted to be connected to a primary ignition system of a vehicle having an engine, the primary ignition system includes a starter having a solenoid, a primary key operated locking ignition switch having a primary key, an accessory terminal, an ignition terminal, a battery terminal, and a solenoid terminal, a steering assembly, and a battery having a positive terminal and a negative terminal, said secondary ignition system comprising:

(a) a secondary key operated ignition switch electrically connected to the primary ignition switch, said secondary ignition switch having secondary key, an accessory terminal, an ignition terminal, a battery terminal, and a starter terminal; and (b) a control switch having a first, second and third battery terminals and a first, second and third starter terminals, wherein:

the first battery terminal of the control switch is connected to the battery terminal of the secondary ignition switch; the second battery terminal of the control switch is connected to the positive terminal of the battery; the third battery terminal of the control switch is connected to the battery terminal of the primary ignition switch; the first starter terminal of the control switch is connected to the starter terminal of the secondary ignition switch; the second starter terminal of the control switch is connected to the solenoid of the starter; the third starter terminal of the control switch is connected to the solenoid terminal of the primary ignition switch; and wherein:

the accessory terminal of the secondary ignition switch is connected to the accessory terminal of the primary ignition switch; and the ignition terminal of the secondary ignition switch is connected to the ignition terminal of the primary ignition switch, whereby when the control switch is in a first position the secondary ignition switch is operative, such that the secondary key will start the engine of the vehicle and power the accessory terminal of the secondary ignition switch, and locks the steering assembly;

when the control switch is in a second position the secondary ignition switch is disabled and the primary ignition switch is operative, such that the primary key starts the engine and unlocks the steering assembly; and when the control switch is in a third position the locking primary ignition switch and the secondary ignition switch are disabled.

6. A secondary ignition system adapted to be connected to a primary ignition system of a vehicle having an engine, the primary ignition system includes a starter having a solenoid, a primary key operated locking ignition switch having a primary key, an accessory terminal, an ignition terminal, a battery terminal, and a solenoid terminal, a steering assembly, and a battery having a positive terminal and a negative terminal, said secondary ignition system comprising:

(a) a secondary key operated ignition switch electrically connected to the primary ignition switch, said secondary ignition switch having a secondary key, an accessory terminal, an ignition terminal, a battery terminal, a starter terminal, and a secondary key; and (b) a control switch having a first, second and third battery terminals and a first, second and third starter terminals, wherein:

the first battery terminal of the control switch is connected to the battery terminal of the secondary ignition switch; the second battery terminal of the control switch is connected to the positive terminal of the battery; the third battery terminal of the control switch is connected to the battery terminal of the secondary ignition switch; the first starter terminal of the control switch is connected to the starter terminal of the secondary ignition switch; the second starter terminal of the control switch is connected to the solenoid of the starter; the third starter terminal of the control switch is connected to the solenoid terminal of the primary ignition switch; and wherein:

the accessory terminal of the secondary ignition switch is connected to the battery terminal of the primary ignition switch; and the ignition terminal of the secondary ignition switch is connected to the accessory terminal and to the ignition terminal of the primary ignition switch, whereby when the control switch is in a first position the secondary ignition switch is operative, such that the secondary key will start the engine of the vehicle and power the accessory terminal of the secondary ignition switch, and locks the steering assembly;

when the control switch is in a second position the secondary ignition switch is disabled and the primary ignition switch is operative, such that the primary key starts the engine and unlocks the steering assembly; and when the control switch is in the third position and the secondary key is removed from the secondary key operated ignition switch the locking primary ignition switch and the secondary ignition switch are disabled with no current flow to the primary ignition switch.

* * * * *